Figure 1:
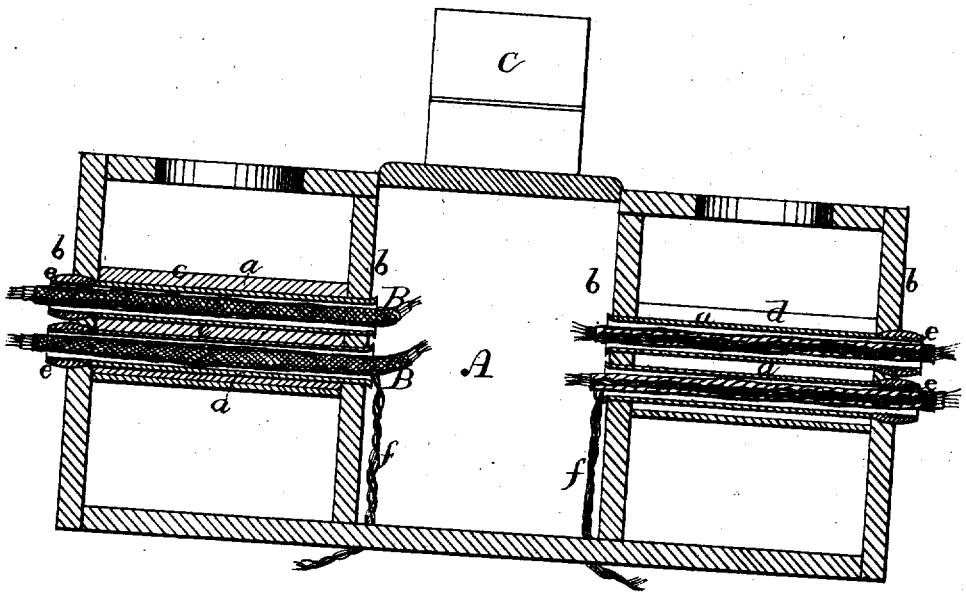

2 Sheets—Sheet 1.

W. MACKINTOSH.

Underground Telegraph Line.

No. 9,627.

Reissued March 29, 1881.

Witnesses;

Miller C. Earl

Mc K. Lockwood French.

Inventor;

William Mackintosh, by Frank L. Pope,

Attorney.

N. PETERS, Photo-Lithographer, Washington, D. C.

W. MACKINTOSH.

Underground Telegraph Line.

No. 9,627. Reissued March 29, 1881.

Witnesses;
Miller C. Earl
Mrs K. Lockwood French,

Inventor;
William Mackintosh,
by Frank L. Poe,
Attorney.

N. PETERS, Photo-Lithographer, Washington, D. C.

UNITED STATES PATENT OFFICE.

WILLIAM MACKINTOSH, OF NEW YORK, N. Y.

UNDERGROUND-TELEGRAPH LINE.

SPECIFICATION forming part of Reissued Letters Patent No. 9,627, dated March 29, 1881.

Original No. 186,356, dated January 16, 1877. Application for reissue filed October 7, 1880.

*To all whom it may concern:*

Be it known that I, WILLIAM MACKINTOSH, a citizen of the United States, residing in the city, county, and State of New York, have invented certain new and useful Improvements in Underground-Telegraph Lines; and I do hereby declare the following to be a full, clear, and exact description thereof, reference being had to the accompanying drawings.

My invention relates to a system of underground-telegraph conductors, and of conduits for inclosing and protecting the same, and also to an improved method of placing the conductors within the conduits, whereby a system of conduits of any required extent may be permanently constructed beneath the ground and under roads or streets in convenient sections, and the telegraphic conductors may afterward, or at any time, be placed therein, withdrawn, tested, and repaired in sections without the necessity of excavating or obstructing the street or roadway, as has heretofore been the case.

In Letters Patent of the United States granted to me January 20, A. D. 1874, I have shown and described a series of working vaults or chambers connected by a series of conduits opening laterally into them, and a series of sectional conducting-wires inclosed within said conduits and strained upon and between insulating-supports arranged within the conduit, in such manner that each conducting-wire is entirely independent of the others, and may be removed or replaced without reference to the other wires in the same conduit.

My present invention embodies certain improvements in the system described in the hereinbefore-mentioned patent, whereby a much greater number of conductors may be placed within a conduit of given size, and yet admit of convenient removal, replacement, or repairs, while at the same time the objections arising from the strain upon the wires and the necessity of tightening them from time to time are avoided.

To this end my invention consists in the combination, with the vaults or working-chambers and the connecting-conduits opening laterally into them, of a series of sectional cables composed of groups of insulated conducting-wires loosely inclosed within said conduits, said cables being constructed in independent sections equal in length to the distance between said working-chambers, in which the adjacent ends of said cables are united to form continuous lines, whereby a great number of conductors may be placed within a comparatively small conduit and relieved from undue strain, and removal, replacement, or repairs may be effected with convenience and facility.

The invention further consists in the combination of sectional looping-conduits with the several ends of the main conduit and the ends of the severed cable inclosed therein, whereby the cable may be diverted from the line of the main conduit for the purpose of entering a station located at a point between the working-chambers.

Figure 2:
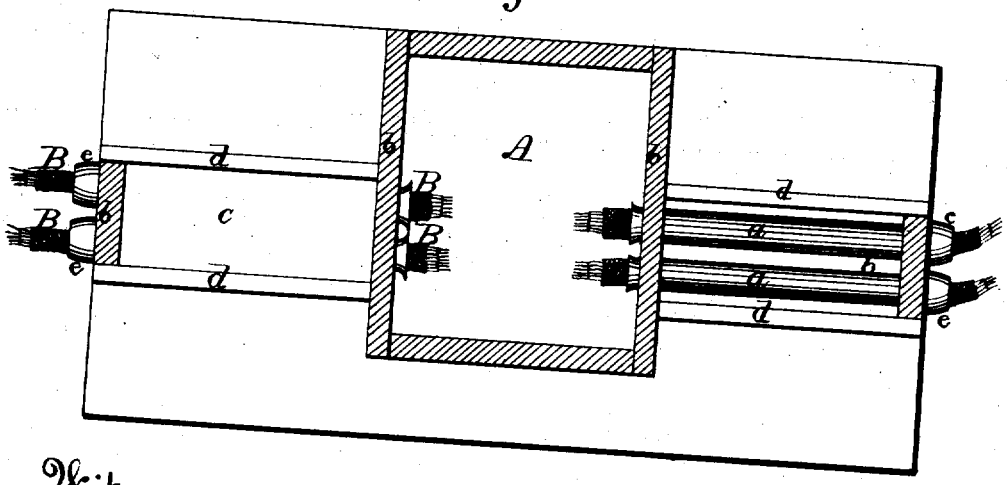
Figure 3:
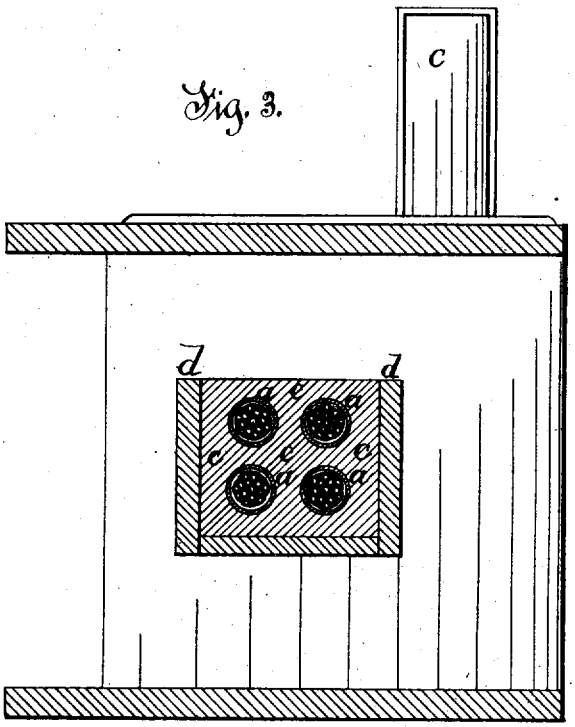

In the accompanying drawings, Figure 1 represents a vertical section of an underground-telegraph-cable trunk embracing my invention; Fig. 2, a top view thereof, one section of the trunk showing the conduits uncovered and the other with them embedded and covered; Fig. 3, a cross-section, and Fig. 4 a view showing the outside looping of the cables for opening offices.

In carrying out my invention I prefer to employ iron or earthen pipes *a a*, which may be from twelve to twenty-five feet long, and to lay them horizontally, their ends being supported in frames *b b*. When more than one line of conduits is required, which will usually be the case, the several lines of pipes are laid parallel to, but not touching, each other, and are maintained in this position by the frames *b b*. The pipes *a a* are then embedded in plastic material, such as hot asphaltum or Roman cement, which is poured over, under, and between the pipes, as shown at *c*, and then allowed to become hard. The frames *b b* also support troughs *d d*, which serve to confine the plastic material while the same is being placed upon and around the pipes. The pipes *a a* may be extended longitudinally to any required distance, the several lengths thereof being connected together in the usual manner, before the plastic material is applied, by means of right and left screw-couplings *e*, and care should be taken that the couplings of separate lines of pipes do not touch each other. The separate pipes thus coupled together and embedded constitute a conduit for containing and protecting the insulated telegraphic conductors, as will be hereinafter more fully explained. At suitable distances apart along the line of the route vaults or working-chambers A are provided, these being preferable constructed beneath the surface of the earth, and the pipes or conduits, being also placed in a trench beneath the surface, are made to terminate at each end of a section in a working-chamber. Thus the structure consists of a series of vaults or working-chambers at convenient distances apart, connected by conduits extending from one working-chamber to the next one, the open ends of the conduits terminating in the working-chambers, as clearly shown in Figs. 1 and 2.

It is obvious that any required number of cable-conduits may be grouped and laid in this manner. A pipe of one and a half inch diameter will contain a cable of fifteen or twenty insulated wires. Four such pipes, together with the containing-trough *d*, will not occupy a space of more than six inches square, and will accommodate from sixty to eighty wires. Such a system of conduits can be laid under any road, street, or sidewalk at a comparatively small expense, while its durability will be very great.

The insulating conducting-wires are made up to cables B B of, say, fifteen to twenty wires each, and may be covered or sheathed with canvas or bagging material and coated with tar. The cables B B are made in sections of a length somewhat exceeding the length of the conduit-sections from one working-chamber to another. The ends of each cable will therefore project from the mouth of the conduit, so that the ends of the wires of the next cable-section may be connected therewith in the working-chamber common to both.

The method by which the cables B B are placed in the conduits after their completion is by attaching a draft-line, such as a wire or wire-rope, to a head, box, or plunger of a size to fit the conduit, and running the plunger and draft-line through from one working-chamber A to another by exhausting the air in front of the plunger. The draft-line is then attached to one end of a cable, and the latter drawn into and through the conduit from one working-chamber to the other. In this way all the conduits laid may be filled with cables, or spare conduits may be left to be filled with cables in the same manner at any time circumstances may require an increase of lines. Conductors may be renewed at any time by drawing out a defective cable and drawing in a perfect one.

The conductors may be extended out of the vaults or working-chambers in any direction, as required, after connecting them with a testing-switch, and the cables may be tested in each separate section, either above ground or in the working-chambers. The ends of the cables may be brought above the surface of the ground in an iron testing-box, C, with a door. This box should be lined with vulcanized or hard rubber, glass, or porcelain, with binding-screws properly set in the rubber to connect with the cable-conductors.

Ground-wires *f f* may be provided in the chamber A and connected to the projecting ends of the pipes *a a*.

Figure 4:
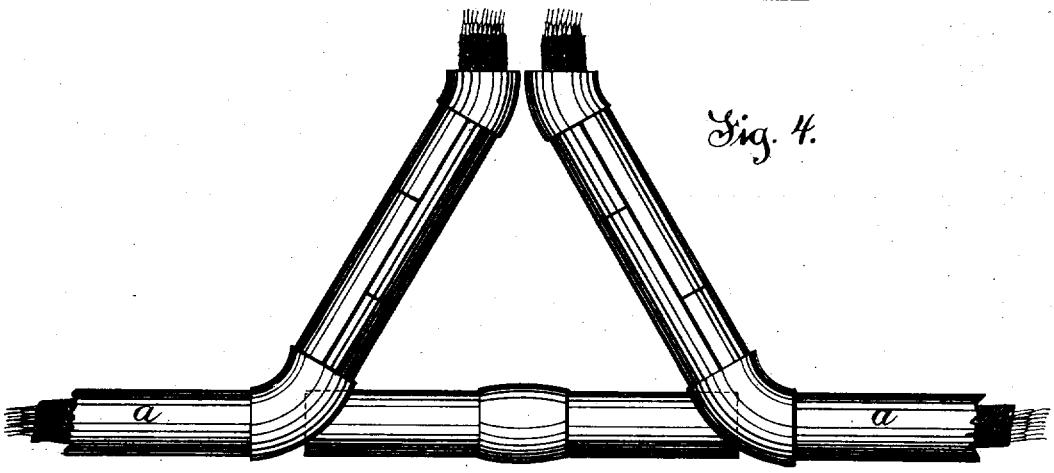

In case a new station is opened on the line of the main conduit at a point between two of the working-chambers A A, and it is desired to bring the wires of some one of the cables into such station, the trench and the bed are opened and the cable cut in one of the conduits and its two ends drawn out of two of the adjacent sections, and then encompassed by curved split tubes fitting with lapped joints. These are joined with the main conduits, and afterward built up with and embedded in asphaltum or cement. Thus one cable may be looped into the station without interfering with the working of the others. To do this it is only necessary to open the trunk at three joints of the conduits, which are afterward closed by the bed, leaving the conduit of the two sections hollow by the withdrawal therefrom of the looping ends, as shown in Fig. 4.

I claim as my invention—

1. The system of underground telegraphic conductors constructed substantially as hereinbefore described, consisting of the combination of a series of working-chambers, a series of conduits connecting said working-chambers and opening laterally into them, and of a series of sectional cables composed of groups of insulated conducting-wires loosely inclosed within said conduits, when said cables are constructed in independent sections equal in length to the distance between said working-chambers, in which the adjacent ends of said cables are united to form continuous series and to facilitate removal, replacement, or repairs.

2. The combination, substantially as hereinbefore set forth, of the sectional looping-conduits with the severed ends of the main conduits and the ends of the severed cable inclosed therein.

In witness whereof I have hereunto set my hand this 23d day of September, A. D. 1880.

WM. MACKINTOSH.

Witnesses:
NELSON ZABRISKIE,
FRANK L. POPE.